March 20, 1945.                S. J. JACOBSOHN                 2,371,625
                                 REFRACTOMETER
                             Filed Sept. 14, 1942              2 Sheets-Sheet 1
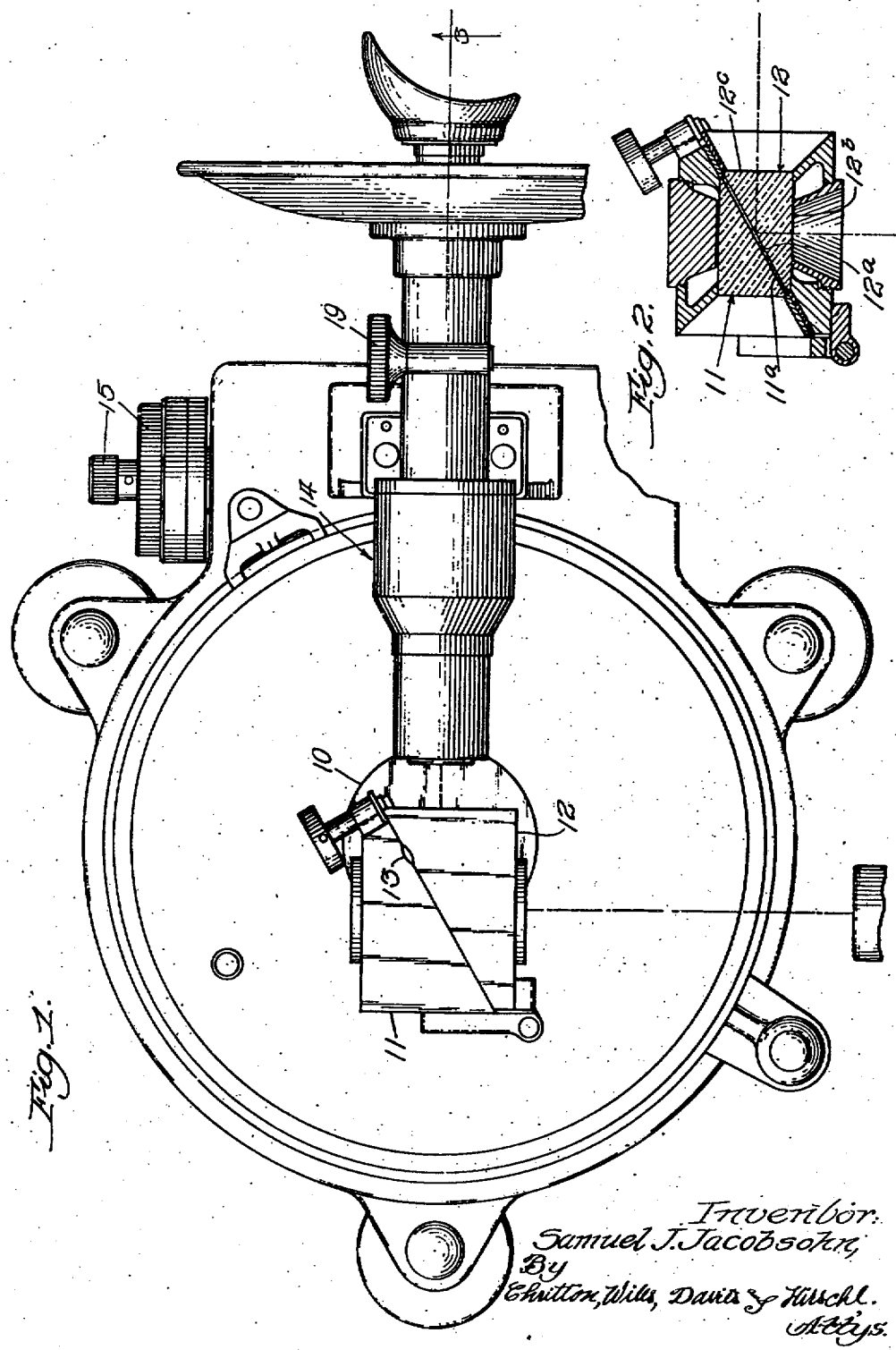

March 20, 1945.   S. J. JACOBSOHN   2,371,625
REFRACTOMETER
Filed Sept. 14, 1942   2 Sheets-Sheet 2
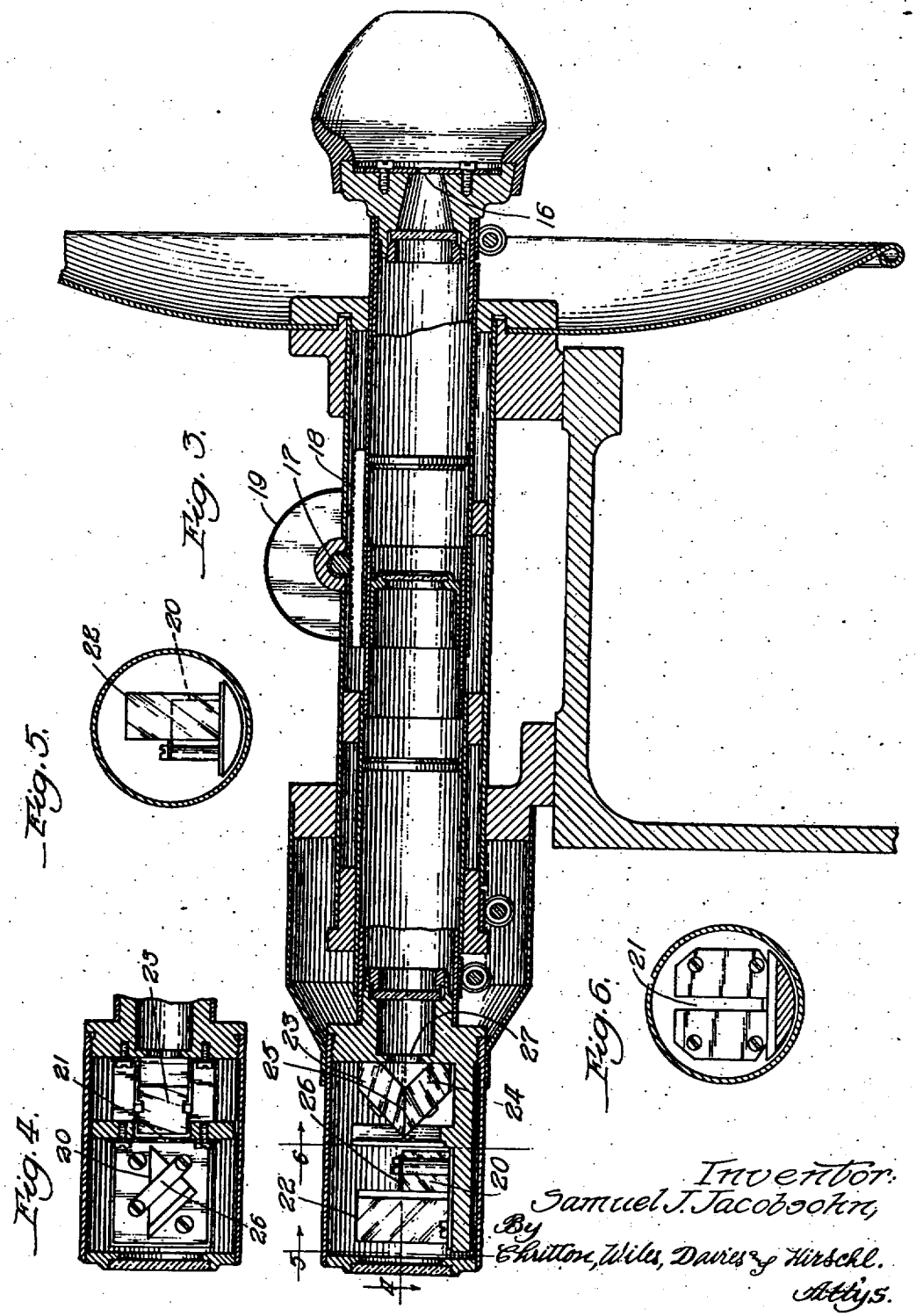
Inventor:
Samuel J. Jacobsohn,
By Chritton, Wiles, Davies & Hirsch
Attys.

Patented Mar. 20, 1945

2,371,625

UNITED STATES PATENT OFFICE 2,371,625

REFRACTOMETER

Samuel J. Jacobsohn, Chicago, Ill., assignor to The Gaertner Scientific Corporation, a corporation of Illinois Application September 14, 1942, Serial No. 458,243

7 Claims. (Cl. 88—14)

This invention relates to a refractometer, and more particularly to an improved instrument of this type enabling an accurate determination in connection with turbid liquids.

One feature of this invention is that it provides a new and improved optical instrument for determining refractive indices; another feature of this invention is that it enables a highly accurate determination of the usual and common refractive index of a homogeneous liquid; yet another feature of this invention is that it enables accurate determination of what may be called the average or mean index of refraction of a turbid liquid, hereinafter termed the index of refraction of such a liquid; still another feature of this invention is that determinations of great accuracy may be made by a relatively unskilled person, and constantly reproduced; other features and advantages of this invention will be apparent from the following specification and the drawings, in which:

Figure 1 is a top plan view of a refractometer embodying my invention; Figure 2 is a horizontal sectional view, for illustrative purposes, through the prism combination; Figure 3 is a vertical sectional view through the viewing telescope, along the line 3 of Figure 1; Figure 4 is a partial horizontal sectional view along the line 4 of Figure 2, showing the reversing arrangement and associated parts; Figure 5 is a transverse sectional view along the line 5 of Figure 3; and Figure 6 is a similar transverse sectional view along the line 6 of Figure 3.

The common conventional refractometer (known as the Abbe refractometer) determines the refractive index of a liquid in contact with the face of a solid, as one face of a glass prism, by determining the angle of incidence of light on the glass-liquid interface at which total reflection ceases. Two prisms of optical glass have faces brought together which are slightly separated through a part of their area to provide a pocket containing a film of the liquid in which the observer is interested. As will be more fully described hereafter in explaining the operation of my refractometer, which is the same as that of the usual refractometer in this portion, light is admitted through one face of one prism to illuminate the glass liquid interface, and the light passed by the prism is examined through a telescope. Rotation of the prism or movement of the telescope about an axis through the glass liquid interface results in varying the angle of incidence of the light which is observed, the angle between the light ray striking this interface and a line perpendicular to the interface. When illumination is from the side, as shown here, and the angle of incidence is large the reflection from the interface is total, and the field viewed in the telescope is brightly illuminated; as the angle of incidence is reduced by movement of one of the elements of the refractometer, however, a point is finally reached where there is a change from total reflection to substantially total transmission. When the light is transmitted through the interface, of course, the field of view is dark. When illumination is through a different face, of course, the light-dark relationship may be reversed.

The liquid in contact with the glass face of the prism has a definite and known effect upon the angle of total reflection (that is, the minimum angle of incidence at which total reflection still occurs). Where $i$ is the angle of incidence on the interface, $n$ the refractive index of the liquid, and $n'$ the refractive index of the prism, this relation is given by the formula $$\sin i = \frac{n}{n'}$$

The refractive index of the particular glass of the prism used is known, and therefore if the angle $i$ is determined by observation it is a rather simple calculation to determine the refractive index of the liquid.

In the conventional refractometer the telescope is provided with a cross hair or pair of cross hairs, and one of the refractometer elements is moved until the division line between light and dark in the field being viewed coincides with the fiduciary mark provided in the telescope by the cross hairs. This is a fairly simple matter with a homogeneous liquid, since total reflection changes almost instantly to substantially total refraction when the limiting angle is reached, and thus half of the field is brightly illuminated and half of the field is quite dark, with a sharp line of demarcation between these two parts.

This is not the case, however, with turbid or non-homogeneous liquids, examples being a starch solution, a solution of finely ground kernels of corn in water or milk. In such cases there is a much more gradual transition from total reflection to substantially total refraction, which may take place over as much as one or two degrees of change of the angle of incidence. Accurate determinations by the common type of refractometer in cases of this kind cannot be made, since individual judgment must be depended upon to determine the median point in the change from a bright field to a dark field. The refractive index of a liquid is a very convenient physical property, particularly when correlated with other physical properties (such as shown solid or liquid contents of turbid mixtures, or the proportions in binary mixtures of liquids), for rapidly and conveniently learning certain known facts with respect to the liquid or solid under consideration. For example, kernels of corn may be finely ground and a known weight added to a known weight of water, the refractive index determined, and the moisture content of the corn thus rapidly and quickly determined without the necessity of going through the longer process of drying a known weight of the corn kernels to constant weight.

I have observed that, where there is a relatively broad transition band from total reflection to total refraction, the reduction in intensity of the field being viewed varies in a direct linear relation to the angle of incidence or, to put it in another way, to the lateral dimension of the field being viewed. I take advantage of this observation in my improved refractometer to provide a field which is uniform in tone or shade when the refractometer is accurately set to the median point of the transition band. In order to effect this, I divide the light entering the front or objective of my telescope into two halves, passing one half of the light directly through the telescope to the eye piece. I pass the other half of the light, however, through a reversing arrangement which reverses it symmetrically about an axial plane bisecting the telescope; and than I completely or partially superimpose the two views thus provided. If the movable element of the refractometer is too far to one side of correct setting (the total reflection side) there is a bright band or streak in the center of the field, with darker portions on each side of it; if the setting is too far the other way, there is a darker band in the center, with lighter portions to each side of it; but when the setting is correct, the shade of the field is uniform throughout. Changes of shade are very apparent, even to a relatively unskilled observer, when viewed in this manner, so that accurate determinations can be made and reproduced without any difference between different observers.

Whether or not this median point in the transition band has heretofore been considered the index of refraction of turbid liquids is not known, but it is believed that it should be so considered, and my refractometer enables accurate determination of it. When used with a homogeneous liquid my refractometer provides exactly the same readings as a conventional refractometer; and my device can go on out into the field of turbid liquids and provide a similar definite and accurately determinable index of refraction, which previous refractometers have been unable to do.

In the particular embodiment of my invention illustrated herewith a table 10 supports a viewed element comprising the prisms 11 and 12. As may be better seen in Figure 2, the two prisms or their holders are in contact around their edges, but the faces 11a and 12a are slightly spaced to enable liquid to be flowed in between them through the opening 13 (shown in Figure 1). Appropriate and conventional means are provided for enabling the prisms to be locked together, and to be separated when desired for cleaning. The prism 12 preferably has polished faces 12a, 12b and 12c, while the face 11a of the other prism is preferably ground. Other methods of illumination may be used, but in the method here shown light enters through the face 12b, strikes the face 12a which is in contact with the liquid there, if conditions are right, and is reflected out through the face 12c to the entrance or objective of the telescope indicated in general as 14. Either the telescope or the prism table is rotatable about an axis passing through or closely adjacent to the liquid glass interface in the viewed element, this axis generally being a perpendicular one. Means for effecting carefully controllable and determinable movement of the movable element is provided, as the knobs 15 operating through appropriate gearing. These knobs are preferably calibrated to provide an indication of the angle of movement, and conventional micrometer means may be associated with the movable element or with the knobs.

In accordance with conventional refractometer practice, the liquid to be observed is placed between the appropriate faces of the prisms and illuminated, and then the movable element of the refractometer is manually moved until transition from light to dark is noted. The observer then endeavors to accurately center this transition, and it is in this latter phase that my refractometer differs from the conventional one.

Referring now more particularly to Figures 3 to 6, it will be seen that the rear portion of my telescope is substantially conventional, being here shown as comprising two symmetrically disposed Ramsden oculars with a horizontal slit 16 at the exit pupil, focusing being effected through the action of the pinion 17 on the rack 18 when the knob 19 is rotated. Inasmuch as the rear portion of the telescope provides the same effect as a conventional low power telescope it will not be further described, and attention will be turned to the forward portion, that portion only being shown in Figure 4.

Turning now to this forward or novel portion, it will be seen that the lower half of the telescope has clamped in place therein by appropriate means a reversing prism 20, this prism being so positioned with respect to a vertical line bisecting the telescope (or at least the operative portion defined by the vertical entrance slit 21) that there is a reversal of the light rays from left to right and right to left, this reversal being around a central axial plane and symmetrical with respect thereto, this plane being parallel to the axis of rotation of the prism. Cemented to the forward surface of the reversing prism 20, as by Canada balsam, is a plate 22 with parallel surfaces, this plate extending up above the ground upper surface of the reversing prism 20, so that all light passing through the upper half of the telescope passes through the plate. Except for a slight displacement of the light rays in the upper half of the telescope, therefore, they pass directly through to the back portion of the telescope and to the eyepiece or exit pupil; whereas, the light rays entering the lower half of the entrance slit 21 are reversed from left to right with respect to those in the upper portion. The plate 22 is of the same material as the reversing prism, and is used so that there will be identical reflection losses in the upper and lower paths.

Immediately behind the entrance slit 21 I have provided a biplate combination comprising the plates 23 and 24. These plates are disposed at a substantial angle to each other, as shown, and provided with ground surfaces at their line of juncture 25, this being arranged to coincide with the upper surface of the reversing prism 20. By the use of these plates the ground glass upper surface of the reversing prism, and the clamping band 26 holding it in place, are eliminated from the field of view. That is, light rays entering the plate 23 move downwardly, although they leave the plate parallel to their direction of entrance, and light rays entering the lower plate 24 similarly move upwardly. Thus, portions of the reversing prism and of the plate are used which are somewhat spaced from the upper surface of the reversing prism, so that there is no distraction or undesired break in the field of view. The light rays leaving the biplate combination are delivered to the entrance pupil 27 and viewed in conventional manner through the telescope.

The image of the line of juncture of the plates 23 and 24 is preferably focused on the exit pupil slit or aperture 16, and if this is done a uniform field of view is obtained provided the juncture line bisects this aperture. Under certain circumstances it may be desirable to have this out of focus so that the view provided through the upper half of the entrance pupil does not completely overlap the view provided by the lower half, but only partially so. In any case, the width of the entrance slit 21 and the exit slit 16 must be so chosen or adjusted that the image passing through the exit slit lies entirely within the area of the pupil of the operator using the instrument, since in the ultimate analysis it is in the eye of the observer, in this particular instrument, that the superposition takes place. It will be understood, of course, that the reversal is from right to left, while the overlapping is from top to bottom. If properly focused the overlapping is total and the entire field of view is of a uniform shade when the proper angle is reached by the movable element of the refractometer. Under certain other circumstances the views only partially overlap, so that there would be a central horizontal band of uniform intensity, an upper direct view band and a lower reversed view band, these enabling better comparison of the various views. I prefer, however, to focus the junction of the two plates on the exit pupil, so that there will be a single field of uniform shade when the proper angle has finally been reached.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In an instrument for investigating the light refracting effect of a liquid by observing the reflection of light from the interface of a solid and such liquid, including: means providing a direct view of a part of a field affected by a portion of said interface, said part including the dividing line between the dark and light areas of the interface; means simultaneously providing a view of a similar part of said field with the light and dark areas interchanged; and means for at least partially superimposing said views with the light area of each view at least partially superimposed on the dark area of the other view, the determination being made in accordance with the resultant light intensities.

2. A refractometer adapted to determine the index of refraction of a turbid liquid by accurately observing the reflection of light from the interface of a solid and such liquid, including: means providing a direct view of a part of a field affected by a portion of said interface, said part including the dividing line between the dark and light areas of the interface; means simultaneously providing a view of a similar part of said field with the light and dark areas interchanged; means for at least partially superimposing said views with the dividing lines parallel and the light areas of each view at least partially registering with the dark area of the other view; and means for changing the angle of view of said interface, this means including indicating means for providing an indication of the index of refraction.

3. In an instrument for investigating the light refracting effect of a substance, said instrument having a viewing element operatively associated with an illuminated viewed element wherein light is reflected from the interface of two adjacent substances with different refractive indices, said viewing element including: a telescope having an eyepiece; means for permitting part of the light entering the telescope to pass directly to the eye to provide a direct view of a part of a field including the dividing line between the dark and light areas of the interface; means for reversing part of the light entering the telescope before it is delivered to the eye to provide a reversed view including said dividing line but with the dark and light areas interchanged; and means for at least partially superimposing said views with the light area of each view at least partially superimposed on the dark area of the other view.

4. In an instrument for investigating the light refracting effect of a substance, said instrument having a viewing element operatively associated with an illuminated viewed element wherein light is reflected from the interface of two adjacent substances with different refractive indices, and one of said elements is movable about an axis, said viewing element including: a telescope having an eyepiece; means for permitting part of the light entering the telescope to pass directly to the eyepiece to provide a direct view of a part of a field including the dividing line between the dark and light areas of the interface; means for reversing part of the light entering the telescope before it is delivered to the eyepiece to provide a reversed view including said dividing line but with the dark and light areas interchanged, said reversal being about an axial plane bisecting the telescope and parallel to the first mentioned axis; and means for at least partially superimposing said views with the light area of each view at least partially superimposed on the dark area of the other view.

5. In an instrument for investigating the light refracting effect of a substance, said instrument having a viewing element operatively associated with an illuminated viewed element wherein light is reflected from the interface of two adjacent substances with different refractive indices, and one of said elements is movable about an axis, said viewing element including: a telescope having an eyepiece; a reversing prism in the telescope through which half of the light entering the telescope passes on its way to the eyepiece, the prism effecting a reversal about an axial plane bisecting the telescope and parallel to the first mentioned axis; compensating means in the telescope through which the other half of the light entering the telescope passes on its way to the eyepiece, this means effecting the same reflection loss in the light passing through it, but without reversal thereof, as in the light passing through the prism, whereby there is provided a direct view of a part of a field including the dividing line between the dark and light areas of the interface and a reversed view including said dividing line but with the dark and light areas interchanged; and means for at least partially superimposing said views with the light area of each view at least partially superimposed on the dark area of the other view.

6. The apparatus claimed in claim 5, including a bi-plate combination between the prism and the compensating means on the one hand and the eyepiece of the telescope on the other hand, said bi-plate combination including means for intercepting light closely adjacent the dividing line between the direct and reversing light paths, whereby only such light is delivered to the eyepiece as was initially spaced from said dividing line, the bi-plate combination being so constructed and arranged as to converge the light passing therethrough sufficiently to close up the gap which would otherwise be left by the intercepting means.

7. In an instrument for investigating the light refracting effect of a substance, said instrument having a viewing element operatively associated with an illuminated viewed element wherein light is reflected from the interface of two adjacent substances with different refractive indices, and one of said elements is movable about an axis, said viewing element including: a telescope having an eyepiece; a reversing prism in the telescope through which half of the light entering the telescope passes on its way to the eyepiece, the prism effecting a reversal about an axial plane bisecting the telescope and parallel to the first mentioned axis; a plate in the telescope adjacent the prism and through which the other half of the light entering the telescope passes on its way to the eyepiece, this plate effecting the same reflection loss in the light passing through it, but without reversal thereof, as in the light passing through the prism, this means providing a direct view of a part of a field including the dividing line between the dark and light areas of the interface, the prism providing a reversed view including said dividing line but with the dark and light areas interchanged; means for at least partially superimposing said views with the light area of each view at least partially superimposed on the dark area of the other view; and a bi-plate combination between the prism and the plate on the one hand and the eyepiece of the telescope on the other hand, said bi-plate combination including means for intercepting light closely adjacent the dividing line between the direct and reversing light paths, the bi-plate combination being so constructed and arranged as to converge the light passing therethrough sufficiently to close up the gap which would otherwise be left by the intercepting means, whereby only such light is delivered to the eyepiece as was initially spaced from said dividing line between the direct and reversing light paths.

SAMUEL J. JACOBSOHN.

CERTIFICATE OF CORRECTION.

Patent No. 2,371,625.                                                      March 20, 1945.

SAMUEL J. JACOBSOHN.

It is hereby certified that error appears in the printed specification of the above numbered patent requiring correction as follows: Page 2, first column, line 5, for the word "shown" read --known--; and that the said Letters Patent should be read with this correction therein that the same may conform to the record of the case in the Patent Office.

Signed and sealed this 12th day of June, A. D. 1945.

Leslie Frazer (Seal)                                                              Acting Commissioner of Patents.

out reversal thereof, as in the light passing through the prism, whereby there is provided a direct view of a part of a field including the dividing line between the dark and light areas of the interface and a reversed view including said dividing line but with the dark and light areas interchanged; and means for at least partially superimposing said views with the light area of each view at least partially superimposed on the dark area of the other view.

6. The apparatus claimed in claim 5, including a bi-plate combination between the prism and the compensating means on the one hand and the eyepiece of the telescope on the other hand, said bi-plate combination including means for intercepting light closely adjacent the dividing line between the direct and reversing light paths, whereby only such light is delivered to the eyepiece as was initially spaced from said dividing line, the bi-plate combination being so constructed and arranged as to converge the light passing therethrough sufficiently to close up the gap which would otherwise be left by the intercepting means.

7. In an instrument for investigating the light refracting effect of a substance, said instrument having a viewing element operatively associated with an illuminated viewed element wherein light is reflected from the interface of two adjacent substances with different refractive indices, and one of said elements is movable about an axis, said viewing element including: a telescope having an eyepiece; a reversing prism in the telescope through which half of the light entering the telescope passes on its way to the eyepiece, the prism effecting a reversal about an axial plane bisecting the telescope and parallel to the first mentioned axis; a plate in the telescope adjacent the prism and through which the other half of the light entering the telescope passes on its way to the eyepiece, this plate effecting the same reflection loss in the light passing through it, but without reversal thereof, as in the light passing through the prism, this means providing a direct view of a part of a field including the dividing line between the dark and light areas of the interface, the prism providing a reversed view including said dividing line but with the dark and light areas interchanged; means for at least partially superimposing said views with the light area of each view at least partially superimposed on the dark area of the other view; and a bi-plate combination between the prism and the plate on the one hand and the eyepiece of the telescope on the other hand, said bi-plate combination including means for intercepting light closely adjacent the dividing line between the direct and reversing light paths, the bi-plate combination being so constructed and arranged as to converge the light passing therethrough sufficiently to close up the gap which would otherwise be left by the intercepting means, whereby only such light is delivered to the eyepiece as was initially spaced from said dividing line between the direct and reversing light paths.

SAMUEL J. JACOBSOHN.

---

CERTIFICATE OF CORRECTION.

Patent No. 2,371,625.  March 20, 1945.

SAMUEL J. JACOBSOHN.

It is hereby certified that error appears in the printed specification of the above numbered patent requiring correction as follows: Page 2, first column, line 5, for the word "shown" read --known--; and that the said Letters Patent should be read with this correction therein that the same may conform to the record of the case in the Patent Office.

Signed and sealed this 12th day of June, A. D. 1945.

Leslie Frazer (Seal)  Acting Commissioner of Patents.